United States Patent [19]

Urabe

[11] 4,441,103
[45] Apr. 3, 1984

[54] UNUSUAL VIBRATION TRANSDUCER APPARATUS IN MACHINE TOOLS

[75] Inventor: Hirokuni Urabe, Fukuyama, Japan

[73] Assignee: Shigiya-Machinery Works Ltd., Japan

[21] Appl. No.: 266,763

[22] Filed: May 26, 1981

[51] Int. Cl.³ .............................................. G08B 21/00
[52] U.S. Cl. .................................... 340/680; 51/2 C; 51/2 AA; 51/165.76; 340/683
[58] Field of Search ................. 340/680, 683; 51/2 C, 51/2 AA, 165.71, 165.75, 165.76

[56] References Cited

U.S. PATENT DOCUMENTS

| | | | |
|---|---|---|---|
| 2,932,134 | 4/1960 | Torn et al. | 340/680 X |
| 3,455,149 | 7/1969 | Foster et al. | 340/683 X |
| 3,842,545 | 10/1974 | Possati | 51/165.71 |
| 4,023,044 | 5/1977 | Miller et al. | 340/680 X |
| 4,209,779 | 6/1980 | Beck et al. | 340/683 |
| 4,220,995 | 9/1980 | Shoda | 340/683 X |

Primary Examiner—David L. Trafton
Assistant Examiner—Joseph Nowicki
Attorney, Agent, or Firm—William A. Drucker

[57] ABSTRACT

By mounting unusual vibration transducer apparatus consisting of a piezo-electric vibration detecting member, a pre-amplifier including a gain adjust knob, a comparator including level adjust knob, a monostable multivibrator including a pulse width adjust knob, a preset counter including preset value setting switch, a flip flop memorizing signals, an amplifier amplifying signals, and an output circuit at a machine tool like a grinding machine, a lathe, a milling machine, a planer, and/or a drilling machine, or by mounting only a piezo-electric vibration detecting member and installing the other components at a separate position outside a specified machine tool, vibrations produced during machining work are taken out by a comparator as high or low signal and alarm is then issued when such a vibration reaches the preset value of the counter, causing rotation or travel of a tool to stop or feed of workpiece to stop, and/or causing the rapid infeed rate of wheelhead to be changed to an adequate roughing feedrate.

4 Claims, 4 Drawing Figures

4,441,103

UNUSUAL VIBRATION TRANSDUCER APPARATUS IN MACHINE TOOLS

BACKGROUND OF THE INVENTION

A tool or a workpiece, or a machine tool itself may be damaged or broken, and worst of all, an operator may be injured, due to extraordinary collision of a tool with a workpiece which may be produced by mistakes in operation during machining process in such machine tools as a grinding machine, lathe, milling machine, planer, and drilling machine.

To provide countermeasures against above unusual collision, a preventing means in the prior art is generally effected by detecting fluctuation of the comsumption power of an electric motor for a wheel shaft in case of a grinding machine. However, this detecting method is not sensitive. And it has been also known in the prior art that the feedrate of a tool is changed by taking out specified oscillation waves produced by collision by means of strain gauge, converting said oscillating waves into electrical signals, selecting said electrical signals and amplifying them. But a device for taking out specified oscillating waves becomes complicated and it has a critical defect that it is not sensitive for other than said specified oscillating waves. Still more it is proposed in order to improve such a previous device that a device can detect wide range of frequency. Actually however, it takes at least 100 m. seconds to issue a detection signal in order to effect rectification smoothing.

OBJECT OF THE INVENTION

Therefore, one of the principal objects of the preset invention is to propose a highly sensitive unusual vibration transducer apparatus of simple construction, which is devised to have rapid response within several seconds, causing rotation or travel of a tool to rotate to stop and causing feed of a workpiece to stop. Another object of the present invention is to propose said highly sensitive unusual vibration transducer apparatus by which rapid infeed speed can be instantly changed to an adequate grinding feedrate. These and other objects of the present invention will be made clearer through reading the following description.

BRIEF DESCRIPTION OF THE ATTACHED DRAWINGS

DESCRIPTION OF THE PREFERRED EMBODIMENT

Figure 1:
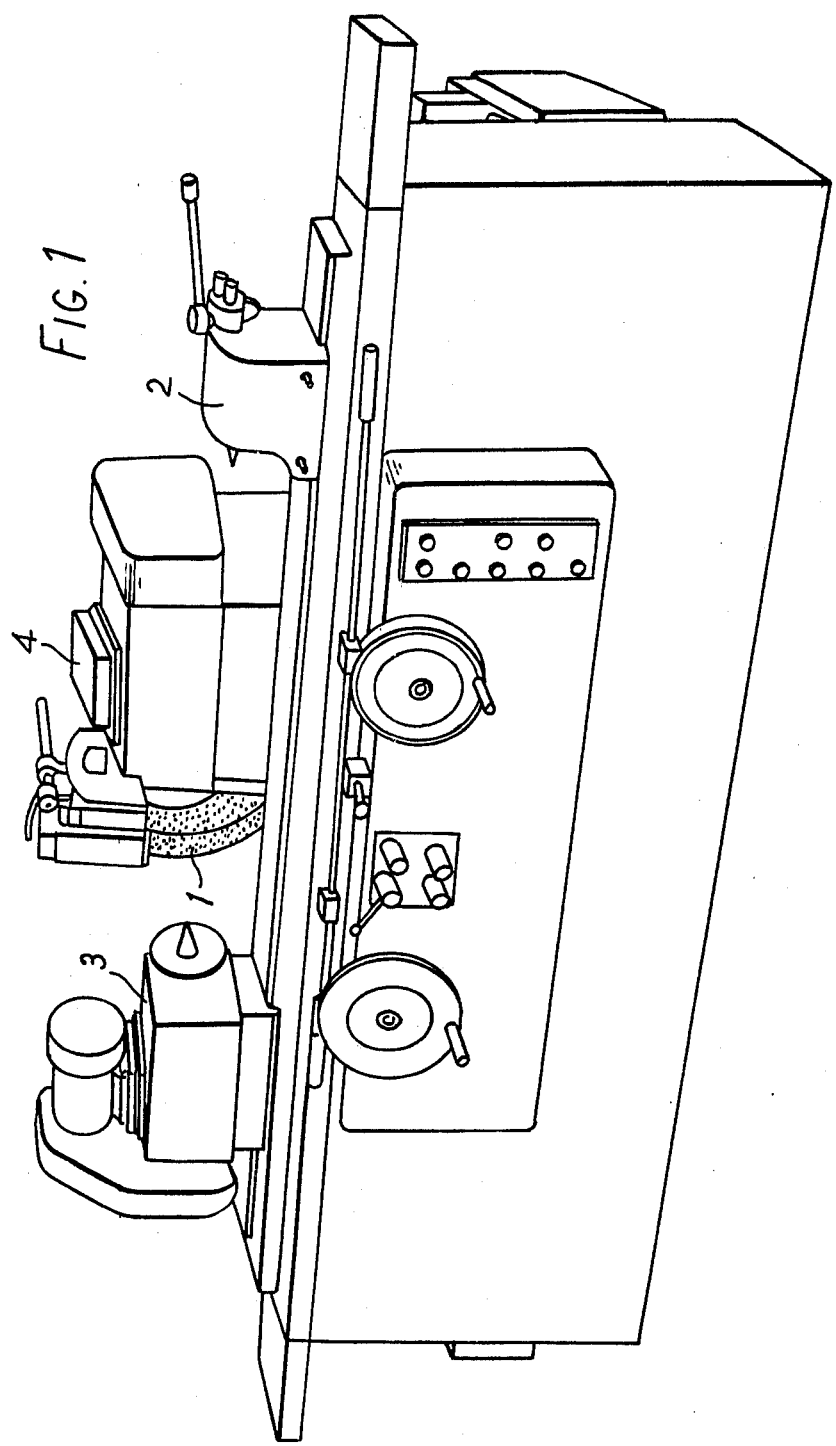
FIG. 1 is a front perspective view showing an unusual vibration transducer apparatus mounted at a wheel head of a grinding machine.

A wheel head is indicated at 1, a tailstock at 2, a work head at 3 and a vibration transducer at 4. Said vibration transducer 4 is mounted on said wheel head 1 at a machine tool side in the illustrated embodiment. This embodiment deals with a grinding machine of many machine tools. In this embodiment, said vibration transducer 4 mounted on said wheel head 1 issues alarm as soon as it catches unusual vibrations, and said vibration transducer 4 simultaneously quickly stops motors for rotating a grinding wheel and travelling a wheel head or also quickly stops motors for turning a workpiece and for feed of said workpiece by means by power generation control. This composition will be described and explained in details in reference with the drawings FIG. 2, 3 and 4 attached here in after. In the drawings, a piezo-electric vibration transducer is indicated at A, Pre-amplifier at B, and Gain-adjust know at C, by which vibration waves are amplified and adjusted adequately (a in FIG. 3). D designates a comparator, E is a variable resistor for level adjust of comparator, by which the level (b in FIG. 3) of vibrations to be taken out is adjusted and is taken out as high or low signals (c in FIG. 3). This means the followings: For example, when a grinding wheel 1 comes in unusual contact with a projected end or the like of a workpiece, vibrations like random signals may be generated at the surface of said grinding wheel and they may be turned into almost inherent frequency of said grinding wheel on the process of transmitting from wheel flange, wheel spindle, bearing of wheel, and spindle then to wheel head. In said piezo-electric vibration transducer A catches said vibrations of random signals, comparatively high inherent vibrations of 3,000 Hz (cycle is about 0 to 33 m. sec.) or the like are obtained and take out as high or low signal by means of a comparator means. However, as vibration level is low in case of usual grinding, it is not taken out as unusual signal. F designates a retriggerable monostable-multivibrator and G is a pulse-width adjust knob by which a short cycle pulse is included in a subsequent pulse and is counted as single pulse (d in FIG. 3), causing high-frequency waves such as electrical noise to be eliminated, and they are input in the pre-set counter H.

At this time, there is provided a monostable multivibrator I to make it possible to give reset signal (e in FIG. 3) to the preset counter H in case a subsequent pulse does not come within a certain time after termination of the former pulse in order to detect whether or not pulces are continuously generated. And there is also provided a pulse width regulator J by which the time before a reset signal is issued after termination of pulse can be freely set. K designates a preset value setting switch by which a specified counter number (7 counts in this example, f in FIG. 3) is set. And when said predetermined counter preset value is reached, a signal (g in FIG. 3) is given to a flip flop L.

Namely, as said flip flop L receives this signal, alarm signal (h in FIG. 3) is operating in said flip flop L till resetting.

M is an amplifier to amplify said signal and N is an output circuit by which rotation and travel of a grinding wheel or a tool (or cutter) and/or feed and rotation of a workpiece can be stopped as soon as an alarm signal is issued.

Figure 2:
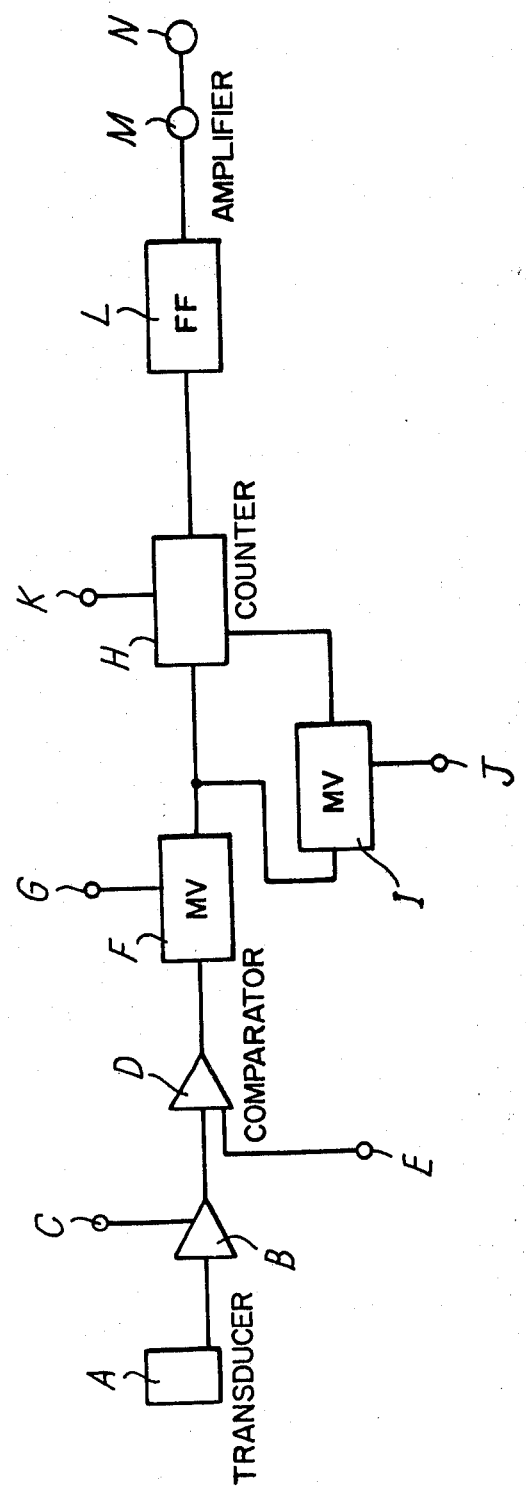
FIG. 2 is a block linear diagram of an unusual vibration transducer apparatus.
Figure 3:
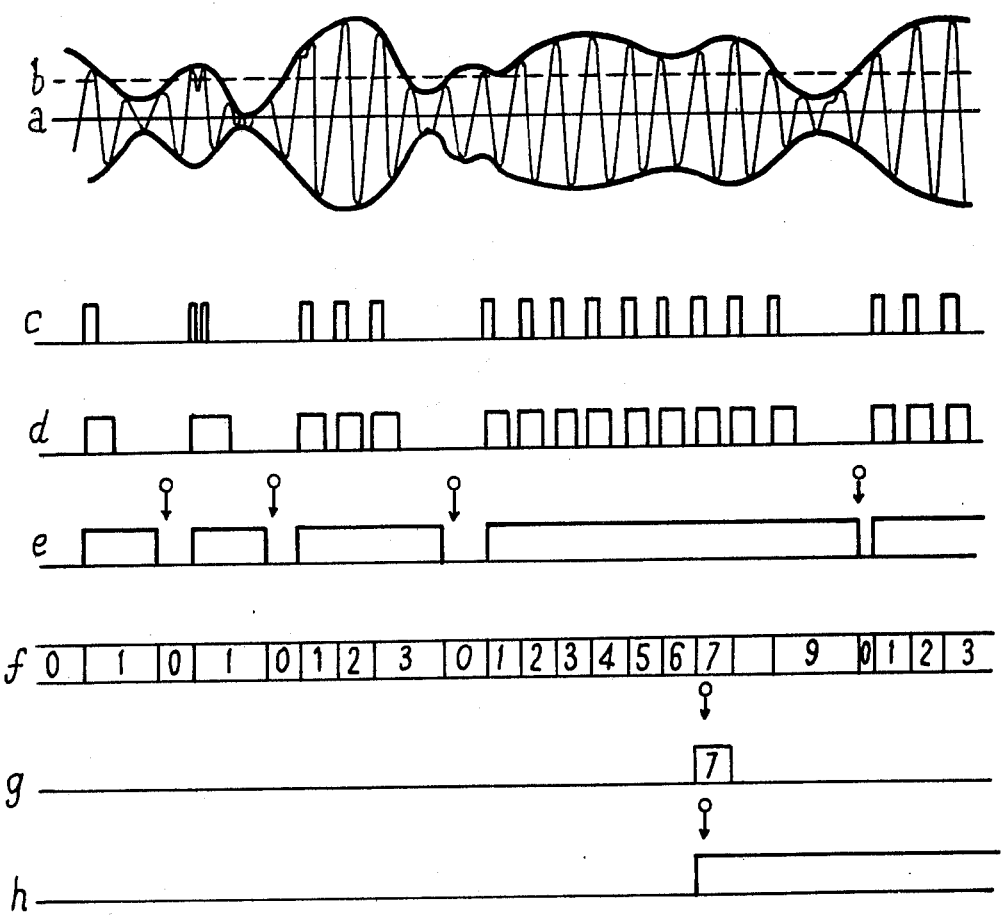
FIG. 3 is a wave diagram showing the configuration of output waves in FIG. 2.
Figure 4:
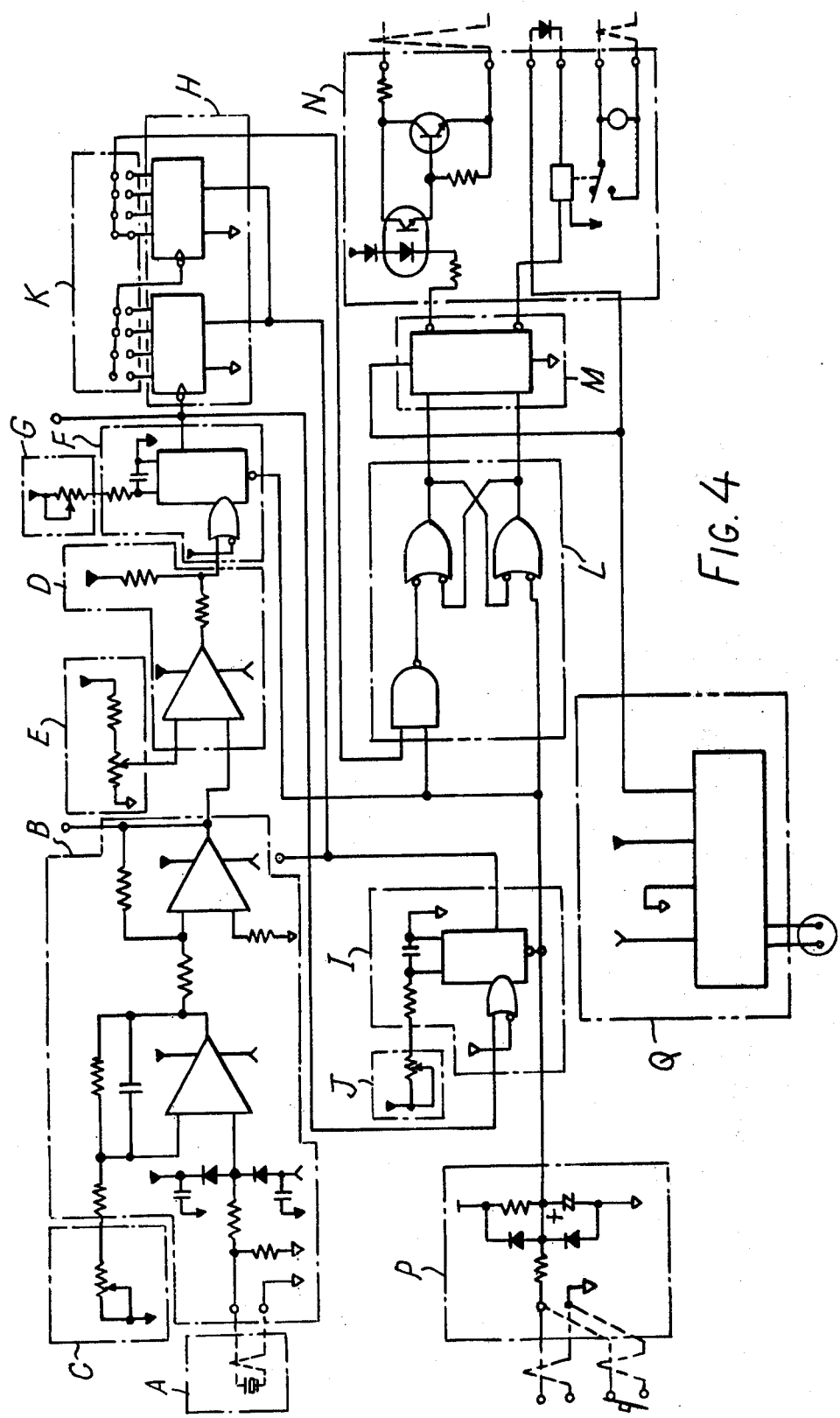
FIG. 4 is a detailed electrical circuits diagram composing the block linear diagram of FIG. 2.

Though not illustrated in FIGS. 2 and 3, said circuit is provided with a circuit to reset an alarm output after unusual vibration stops and a circuit which issues alarm output to advise an operator of unusual vibration to the necessity but does not issue alarm itself (refer to FIG. 4).

A circuit P which makes and breaks the functions of this unusual vibration transducer and a power circuit Q are described in FIG. 4.

The unusual vibration transducer 4 composed in the aboves can catch unusual vibrations in the range of 2 to 3 m. seconds and can instantly issue an alarm and can stop rotation and travel of said wheel or tool like a cutter and/or rotation and feed of a workpiece. Generally speaking, a band-pass filter is used to take out unusual vibrations. But, in this case, vibration input more than at least 100 waves (frequencies) is required. It is therefore necessary to take 0.033 to 0.1 second for this purpose.

However, the unusual vibration transducer of the present invention can save electric treatment time necessary for taking out inherent frequencies. Therefore, the time required from detection of vibration to alarm output can be shortened to one-tenth to one-fiftieth, causing emergent treatment to be instantly carried out and thereby causing a workpiece to be effectively prevented from any injury. The above embodiment shows that the unusual vibration trausducer of the present invention is used for the purpose of stopping rotation or travel of a tool and/or rotation or feed of a workpiece when unusual contact is caused to be present between said tool (or cutter or a grinding wheel) and said workpiece. Besides, said unusual vibration transducer can be utilized as a detecting device for gap eliminator to shorten empty grinding time until a grinding wheel comes in contact with a workpiece for usual grinding work in case of a grinding machine.

Namely, a grinding wheel may be injured if it takes a long time untill a detection signal is issued after it is in contact with a workpiece. Therefore, the primary rapid infeed speed between gap eliminators must be made late, thereby causing the working efficiency to be lowered. To the contrary, if the infeed speed is made quicker in case the time required for issuing a detection signal is short, no injury of a grinding wheel is caused to be present, thereby causing the working efficiency to be much promoted. As described in the aboves, the unusual vibration transducer disclosed by the present invention can catch unusual vibrations within 2 to 3 m. seconds, thereby causing the infeed speed to be instantly changed to the roughing feedrate by installing this unusual vibration transducer at a wheel head as well as the former example. This unusual vibration transducer can be effectively utilized as a detection device for gap eliminator.

However, at this time, said flip flop L is not composed so that it may issue an alarm with a signal (g in FIG. 3) reached the predetermined counter preset value or may command emergent stop of motors for travel of a tool rest or for workpiece feed by actuating power geverating braking force but is composed so that rapid infeed speed by a wheel head may be reset with said signal, which reached the predetermined counter preset value, and may be changed to a feedrate suiting to roughing. These series of movements are performed in connection with a numerical control system.

The above example of embodiments of the present invention described the state that a unusual vibration transducer is installed at the wheel head of a grinding machine. However, said unusual vibration transducer can be, as a matter of course, mounted at a workpiece supporting or chucking side such as a tailstock or a spindle head, too. Actually it is more effective for mounting said unusual vibration transducer at a tool rest of a grinding wheel or a cutter to catch unusual vibrations than for mounting it at said workpiece supporting side.

Besides, mounting the unusual vibration transducer is not limited to that all the components of said transducer are mounted at the machine tool side, but only a piezoelectric vibration detecting member is mounted at the machine tool side and all the other components are separately mounted independent of said machine tool.

I claim:

1. A detection apparatus for gap elimination of a grinding machine tool having a vibration transducer which comprises:
   (a) a vibration sensor mounted on said grinding machine,
   (b) an amplifier to amplify the output signal from said vibration sensor,
   (c) a comparator to compare the output signals from said amplifier with a preset value to provide high-and-low output values,
   (d) a first monostable multivibrator set by said high-and-low output signal and reset in a certain defined time,
   (e) a second monostable multivibrator set by the output from said first monostable multivibrator and reset in a certain defined time to output a reset signal, and
   (f) a preset counter to count the output of said first monostable multivibrator to output pulses when reaching the predetermined preset count and set by the reset signal from said second monostable multivibrator, whereby the rapid infeed rate of a tool is changed to optimum feed when a pulse is generated from said preset counter by vibrations during tool operation.

2. An apparatus as claimed in claim 1 wherein said transducer is a piezoelectric vibration detecting member and all the other components are mounted independent of said machine tool.

3. An apparatus as claimed in claim 1, further including gain adjust means for adjusting the gain of said amplifier, pulse width adjust means for adjusting the pulse width of said first multivibrator, pulse width regulator means for regulating the time before a reset pulse is transmitted from said second multivibrator and means to preset the count in said counter for providing an output therefrom.

4. An apparatus as claimed in claim 2, further including gain adjust means for adjusting the gain of said amplifier, pulse width adjust means for adjusting the pulse width of said first multivibrator, pulse width regulator means for regulating the time before a reset pulse is transmitted from said second multivibrator and means to preset the count in said counter for providing an output therefrom.

* * * * *